US012613992B1

(12) United States Patent
Shapira et al.

(10) Patent No.: US 12,613,992 B1
(45) Date of Patent: Apr. 28, 2026

(54) OVERLAY-BASED HEATMAPS FOR DYNAMIC GRAPHICAL USER INTERFACES

(71) Applicant: Amazon Technologies, Inc., Seattle, WA (US)

(72) Inventors: Sharon Shapira, Sammamish, WA (US); Glenn Tabunan Roman, Temecula, CA (US); Muthukrishnan Suresh, Fremont, CA (US); Pradeep Srinivasamurthy, Fremont, CA (US); Tony Chun Tung Ng, San Ramon, CA (US); Rangarajan Ramachandran, Fremont, CA (US); Sakshi Dhawan, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 18/537,265

(22) Filed: Dec. 12, 2023

(51) Int. Cl.
G06F 21/62 (2013.01)
G06F 11/34 (2006.01)
(52) U.S. Cl.
CPC ...... G06F 21/6245 (2013.01); G06F 11/3438 (2013.01)

(58) Field of Classification Search
CPC ......................... G06F 21/6245; G06F 11/3438
See application file for complete search history.

(56) References Cited

U.S. PATENT DOCUMENTS

2021/0034206 A1* 2/2021 Yap .......................... G06F 3/038
2021/0064486 A1* 3/2021 Rana ................... G06F 11/1484

* cited by examiner

*Primary Examiner* — Daniel F Hajnik
*Assistant Examiner* — Thomas John Foster
(74) *Attorney, Agent, or Firm* — Nicholson De Vos Webster & Elliott LLP

(57) ABSTRACT

Techniques for implementing and utilizing overlay-based heatmaps for dynamic graphical user interfaces are described. A heatmap service obtains event data associated with interaction events originated from users utilizing a graphical user interface (GUI) of an application. The interaction events are correlated with identifiers of the associated GUI element for which the interaction events correspond to. This data is used to generate dynamic heatmaps, via an overlay on top of a webpage, that place heatmap visualization elements on top of the corresponding GUI elements.

20 Claims, 11 Drawing Sheets

APPLICATION
END USER
PERSONA

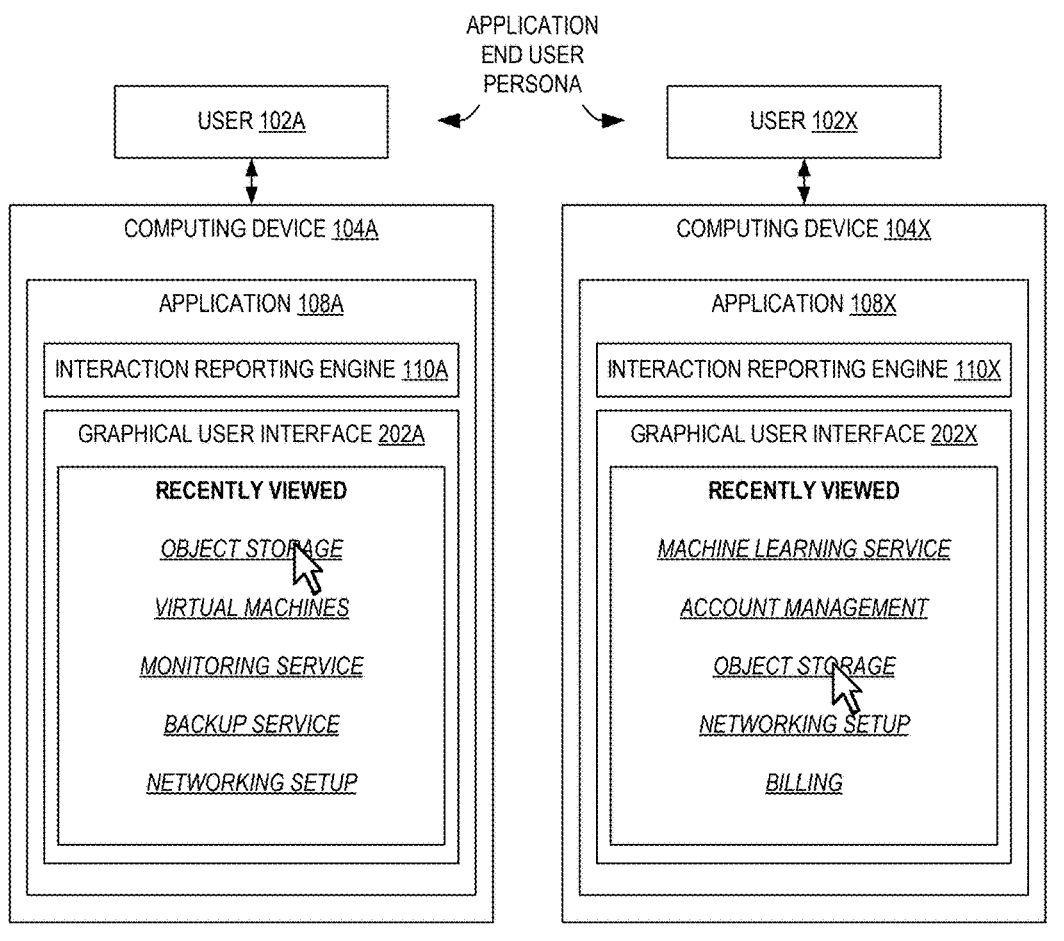

USER 102A

USER 102X

COMPUTING DEVICE 104A

APPLICATION 108A

INTERACTION REPORTING ENGINE 110A

GRAPHICAL USER INTERFACE 202A

RECENTLY VIEWED

*OBJECT STORAGE*

*VIRTUAL MACHINES*

*MONITORING SERVICE*

*BACKUP SERVICE*

*NETWORKING SETUP*

COMPUTING DEVICE 104X

APPLICATION 108X

INTERACTION REPORTING ENGINE 110X

GRAPHICAL USER INTERFACE 202X

RECENTLY VIEWED

*MACHINE LEARNING SERVICE*

*ACCOUNT MANAGEMENT*

*OBJECT STORAGE*

*NETWORKING SETUP*

*BILLING*

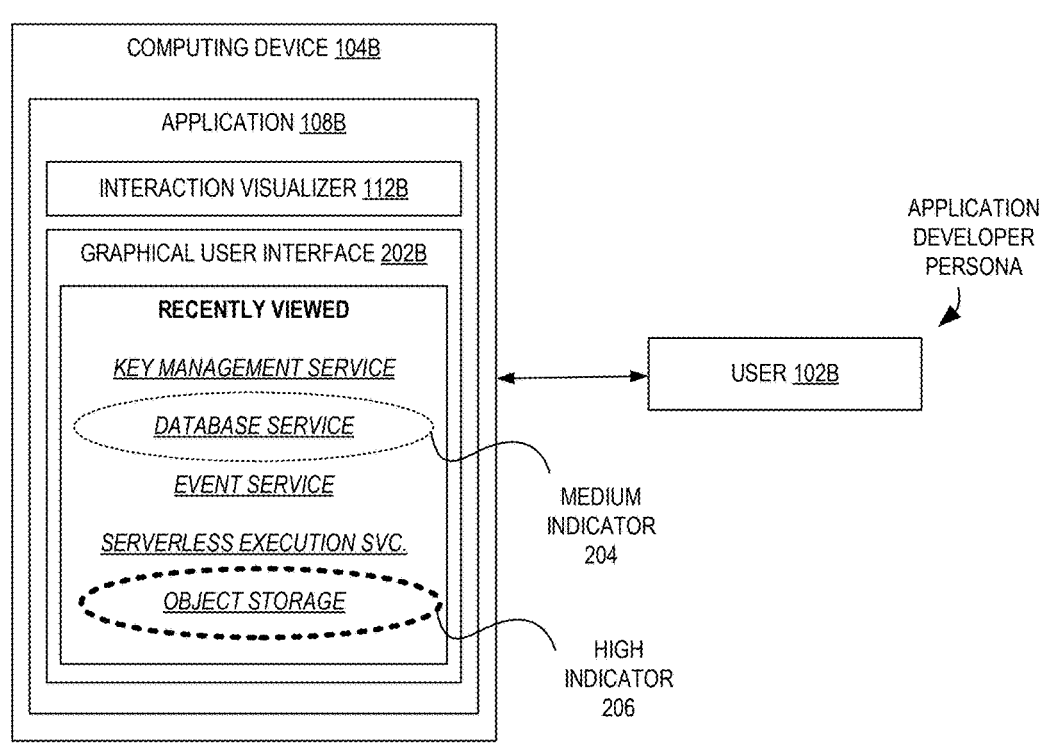

COMPUTING DEVICE 104B

APPLICATION 108B

INTERACTION VISUALIZER 112B

GRAPHICAL USER INTERFACE 202B

RECENTLY VIEWED

*KEY MANAGEMENT SERVICE*

*DATABASE SERVICE*

*EVENT SERVICE*

*SERVERLESS EXECUTION SVC.*

*OBJECT STORAGE*

APPLICATION
DEVELOPER
PERSONA

USER 102B

MEDIUM
INDICATOR
204

HIGH
INDICATOR
206

*FIG. 2*

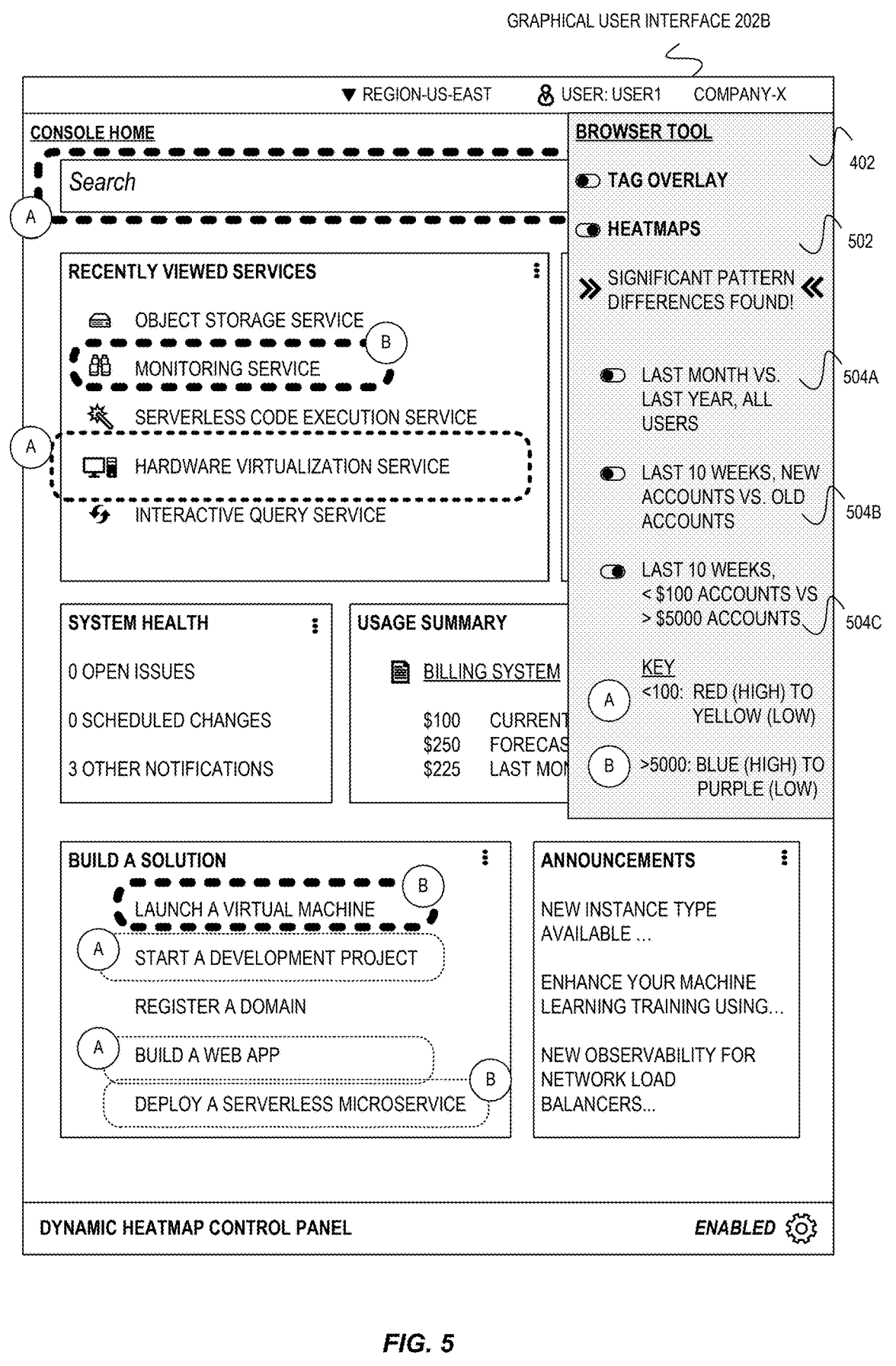

GRAPHICAL USER INTERFACE 202B

▼ REGION-US-EAST    👤 USER: USER1    COMPANY-X

CONSOLE HOME

Search

Ⓐ

BROWSER TOOL

🔘 TAG OVERLAY    402

🔘 HEATMAPS    502

≫ SIGNIFICANT PATTERN ≪
DIFFERENCES FOUND!

🔘 LAST MONTH VS.   504A
LAST YEAR, ALL
USERS

🔘 LAST 10 WEEKS, NEW
ACCOUNTS VS. OLD
ACCOUNTS   504B

🔘 LAST 10 WEEKS,
< $100 ACCOUNTS VS
> $5000 ACCOUNTS   504C

RECENTLY VIEWED SERVICES ⋮

🗄 OBJECT STORAGE SERVICE

Ⓑ

🔭 MONITORING SERVICE

✴ SERVERLESS CODE EXECUTION SERVICE

Ⓐ

🖥 HARDWARE VIRTUALIZATION SERVICE

⚡ INTERACTIVE QUERY SERVICE

KEY

Ⓐ <100: RED (HIGH) TO
YELLOW (LOW)

Ⓑ >5000: BLUE (HIGH) TO
PURPLE (LOW)

SYSTEM HEALTH ⋮

0 OPEN ISSUES

0 SCHEDULED CHANGES

3 OTHER NOTIFICATIONS

USAGE SUMMARY

📄 BILLING SYSTEM $100   CURRENT
$250   FORECAS
$225   LAST MO

BUILD A SOLUTION ⋮

Ⓑ
LAUNCH A VIRTUAL MACHINE

Ⓐ START A DEVELOPMENT PROJECT

REGISTER A DOMAIN

Ⓐ BUILD A WEB APP

Ⓑ

DEPLOY A SERVERLESS MICROSERVICE

ANNOUNCEMENTS ⋮

NEW INSTANCE TYPE
AVAILABLE ...

ENHANCE YOUR MACHINE
LEARNING TRAINING USING...

NEW OBSERVABILITY FOR
NETWORK LOAD
BALANCERS...

DYNAMIC HEATMAP CONTROL PANEL     *ENABLED* ⚙

*FIG. 5*

GRAPHICAL USER INTERFACE 202B

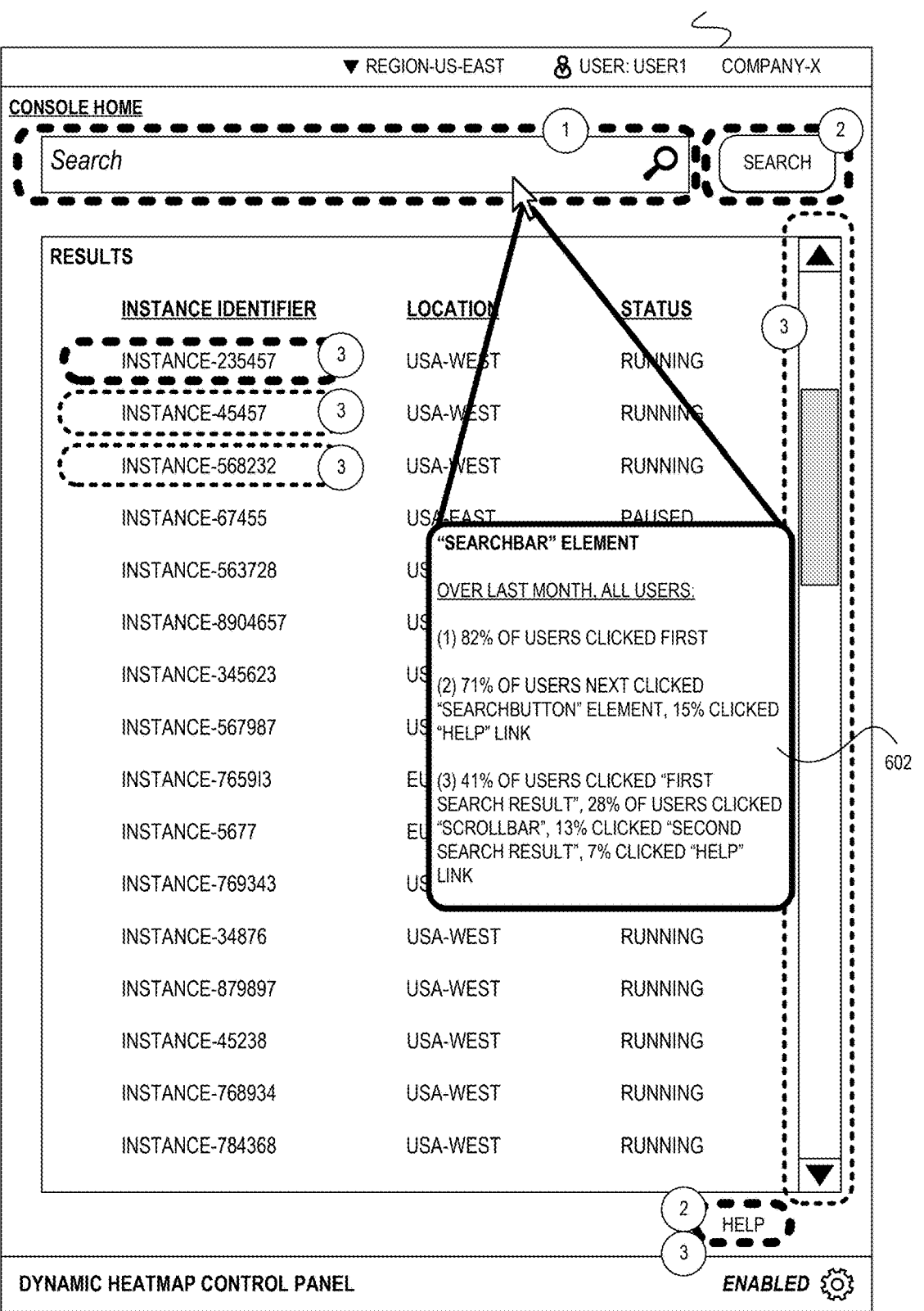

▼ REGION-US-EAST    &  USER: USER1    COMPANY-X

CONSOLE HOME

Search ①                                          🔍    ② SEARCH

RESULTS

| INSTANCE IDENTIFIER | LOCATION | STATUS |
|---|---|---|
| INSTANCE-235457 ③ | USA-WEST | RUNNING |
| INSTANCE-45457 ③ | USA-WEST | RUNNING |
| INSTANCE-568232 ③ | USA-WEST | RUNNING |
| INSTANCE-67455 | USA-EAST | PAUSED |
| INSTANCE-563728 | US | |
| INSTANCE-8904657 | US | |
| INSTANCE-345623 | US | |
| INSTANCE-567987 | US | |
| INSTANCE-765913 | EU | |
| INSTANCE-5677 | EU | |
| INSTANCE-769343 | US | |
| INSTANCE-34876 | USA-WEST | RUNNING |
| INSTANCE-879897 | USA-WEST | RUNNING |
| INSTANCE-45238 | USA-WEST | RUNNING |
| INSTANCE-768934 | USA-WEST | RUNNING |
| INSTANCE-784368 | USA-WEST | RUNNING |

"SEARCHBAR" ELEMENT

OVER LAST MONTH, ALL USERS:

(1) 82% OF USERS CLICKED FIRST (2) 71% OF USERS NEXT CLICKED "SEARCHBUTTON" ELEMENT, 15% CLICKED "HELP" LINK (3) 41% OF USERS CLICKED "FIRST SEARCH RESULT", 28% OF USERS CLICKED "SCROLLBAR", 13% CLICKED "SECOND SEARCH RESULT", 7% CLICKED "HELP" LINK

602

② ③ HELP

DYNAMIC HEATMAP CONTROL PANEL                    ENABLED ⚙

*FIG. 6*

GRAPHICAL USER INTERFACE 202B

OPERATIONS
800

OBTAINING EVENT DATA ASSOCIATED WITH INTERACTION EVENTS ORIGINATED FROM USERS UTILIZING A GRAPHICAL USER INTERFACE (GUI) OF AN APPLICATION, EACH EVENT DATA BEING ASSOCIATED WITH A GRAPHICAL USER INTERFACE (GUI) ELEMENT OF A WEBPAGE OF THE APPLICATION, WHEREIN THE WEBPAGE IS DYNAMIC AND INCLUDES DIFFERENT COLLECTIONS OR ARRANGEMENTS OF GUI ELEMENTS FOR DIFFERENT ONES OF THE USERS 802

GENERATING, BASED ON THE EVENT DATA, HEATMAP DATA FOR THE WEBPAGE 804

TRANSMITTING AT LEAST SOME OF THE HEATMAP DATA TO A COMPUTING DEVICE, CAUSING THE COMPUTING DEVICE TO DISPLAY HEATMAP VISUALIZATION ELEMENTS OVERLAID ON TOP OF A RENDERED VERSION OF THE WEBPAGE 806

*FIG. 8*

OVERLAY-BASED HEATMAPS FOR DYNAMIC GRAPHICAL USER INTERFACES

BACKGROUND

Monitoring user interactions with webpages is a crucial aspect of improving web applications. By tracking user activity, developers can gain insights into how users interact with their applications and identify areas that need improvement. This information can then be used to optimize the user experience, improve website performance, and increase user satisfaction.

For example, user activity monitoring helps to identify abuse to help reduce the risk of inappropriate actions that can lead to malware infections or data breaches. User activity monitoring can also help developers identify user issues resulting from poorly laid-out or non-intuitive designs.

BRIEF DESCRIPTION OF DRAWINGS

Various examples in accordance with the present disclosure will be described with reference to the drawings, in which:

FIG. 2 is a diagram illustrating non-static heatmap element displays for dynamic webpages according to some examples.

FIG. 5 is a diagram illustrating detected pattern difference surfacing via a browser tool and overlaid heatmap data according to some examples.

FIG. 6 is a diagram illustrating heatmap element usage for presenting interaction sequences according to some examples.

FIG. 8 is a flow diagram illustrating operations of a method for utilizing overlay-based heatmaps for dynamic graphical user interfaces according to some examples.

DETAILED DESCRIPTION

Figure 1:
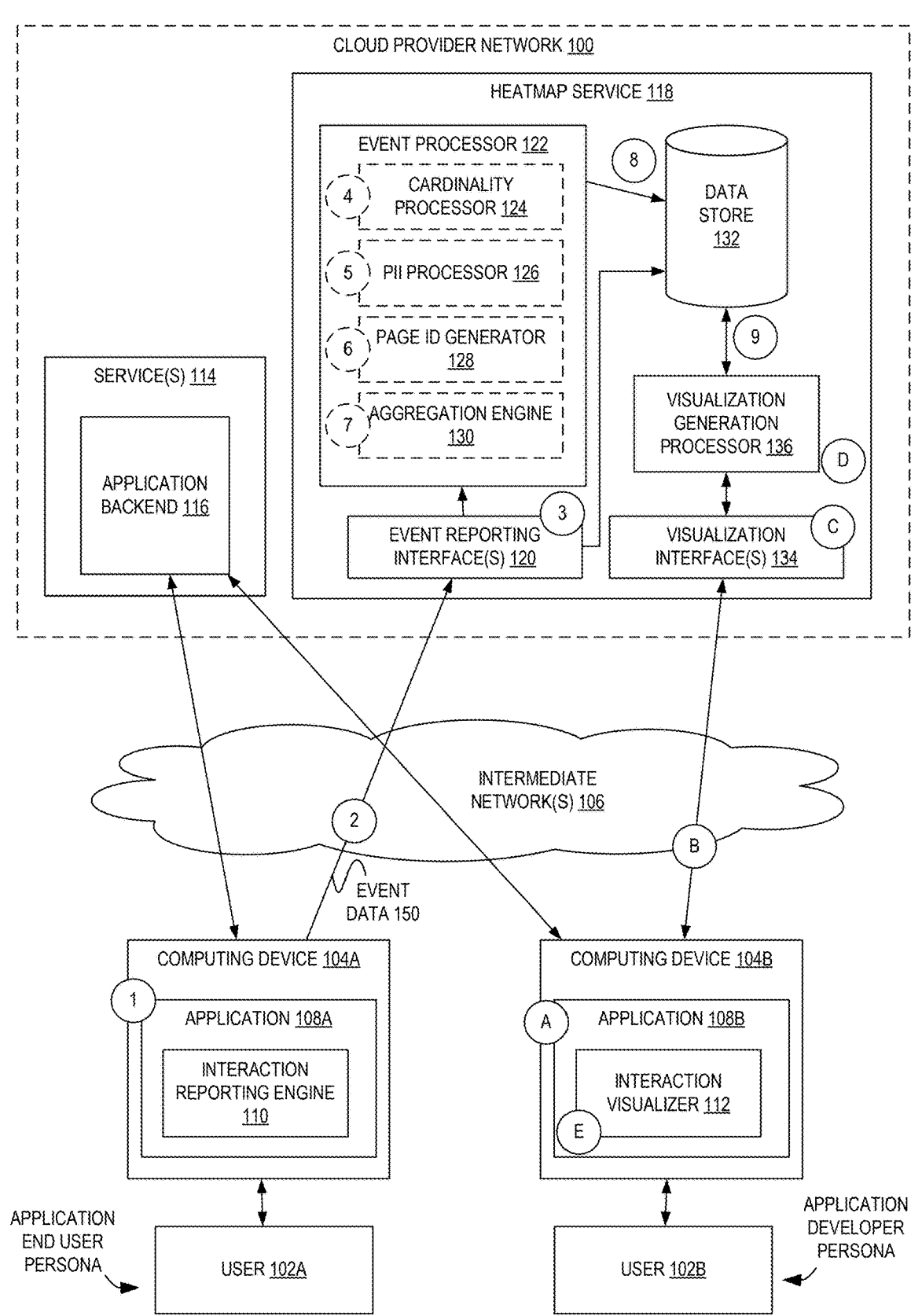
FIG. 1 is a diagram illustrating an environment for implementing and utilizing overlay-based heatmaps for dynamic graphical user interfaces according to some examples.

The present disclosure relates to methods, apparatus, systems, and non-transitory computer-readable storage media for implementing and utilizing overlay-based heatmaps for dynamic graphical user interfaces. According to some examples, a heatmap service is provided that can provide user experience heatmaps using graphical user interface (GUI) overlays that allows heatmaps to be utilized with dynamic applications where different users may have different GUI elements, different locations of GUI elements, and/or different content on a same GUI. In some examples, these dynamic heatmaps can be constructed to show user interaction "heat" (e.g., frequency of interaction) that is specific to a particular GUI element itself, regardless of where it appears on a GUI. In some examples, the existence of heatmap data for a GUI element not being displayed to a particular user can be surfaced to that user. Additionally, or alternatively, different interaction patterns arising out of different groupings (or segments) of users can similarly be presented. In some examples, dynamic heatmaps can also provide interaction sequences arising from users' utilization of a GUI, providing further understanding of the application's user experience.

In contrast to static applications that do not change, many modern applications, such as web applications (or other applications that "wrap" web applications), are "dynamic" in that they may appear differently for different users and/or at different times. For example, users may customize their version of an application, such as by re-ordering the locations of "widgets" of content on a webpage, adding new widgets or removing widgets from the display. Additionally, some applications provide user-customized content, such as lists of resources or assets that are specific to each user, content that may be in a user-selected language, etc. While such dynamic interfaces can be tremendously useful, allowing an application to be highly-tailored to particular users' needs, this customization makes it difficult to analyze the user experience of various users of these applications.

Some modern web applications may include tens, hundreds, thousands (or more) of different webpages that may be dynamic in nature. The developers (or owners, service teams, or the like) that manage these applications want to understand how their users are interacting with different sections of various pages in order to optimize the experience and improve ease of use. For example, a home page may have multiple widgets where users can click on one of the potentially fifty or more links to navigate through the website. In such a case, the developer may need to understand the most and least interactions on the various parts of these pages across particular dimensions, e.g., based on user type ("new" users compared to "experienced" users). However, analyzing recorded "clicks" is not helpful with such dynamic content as patterns cannot be easily discerned when every user (or many users) have different interface elements to interact with.

As another example, an application developer may perform "A/B" testing for releasing new features into these applications, which involves purposefully displaying different versions of an application to different users in order to see which versions work better for users, e.g., to perform deeper analysis on user engagement on the pages between the variants. Further, some applications may have default selections made for their users in the particular workflows (e.g., in particular forms), and the application developers may want to perform analysis of how many times users are overriding the default options, i.e., selecting or providing different values. This, too, is difficult with dynamic applications where different GUI input elements may be located on different portions of different users' displays.

"Heatmap" type analysis can be one useful tool for these types of analysis with static interfaces. As is known to those of skill in the art, heatmaps are visual representations of user behavior on a website or application using color-coded values to compare different elements and identify trends. Heatmaps can display a relative frequency of clicks to different elements on a page, how far users typically scroll down the page, and/or which parts of a page draw users' attention. For example, by testing different layouts and designs and comparing their heatmaps, one can see how user behavior changes as a result. Heatmaps can reveal why users aren't performing certain actions (e.g., making purchases on a storefront) and what important information users may not be seeing or clicking on. Heatmaps can also provide actionable insights into which features customers use and how they can be improved.

However, existing heatmap solutions do not work well with dynamic applications. For example, existing heatmap solutions are typically based on tracking the coordinates (e.g., X, Y coordinates) of interactions (e.g., clicks, hovers, etc.) that occur on a webpage. However, users may have different screen sizes and resolutions, leading to difficulties in knowing precisely which element on a page was interacted with, as this element may be located at a drastically different location on different displays. Further, existing heatmap solutions typically take a snapshot (e.g., a graphical screen capture at a point in time) of the webpage to plot interactions upon; however, many modern websites have user-specific (or configured) data thereupon as these pages are dynamic. Thus, these snapshots do not accurately represent the heatmap due to the snapshot being different than what users are actually interacting with.

Additionally, existing heatmap solutions are static and do not track any order of interactions that users are taking. For example, the "most interacted with" elements on a particular page could be due to "friction" and not due to the importance of an element—e.g., if a user has to perform multiple clicks to complete an action, or if a default setting is not a preferred option and the user has to override a default option. And, as indicated throughout, when webpages arc dynamic, the elements that appear on the page can be different due to personalization, A/B testing, the use of dynamic components such as widgets, etc., and in such cases static heatmaps do not work. Further, in some scenarios, taking snapshots of a particular interface (customized for a particular user) might include user-specific data that could be sensitive or confidential, which thus shouldn't be captured, stored, or used for visualization by other individuals.

In examples disclosed here, a heatmap service utilizes a client-side program (e.g., an interaction reporting engine, which can be implemented using JavaScript bundled with or referenced by webpage data) to collect and report user interactions with webpages of an application such as clicks, views, scroll, hover, dwell time, etc. The heatmap service can use this client-side interaction data to provide dynamic heatmaps showing user interaction information for dynamic applications. In some examples, instead of capturing the screenshot of a page, the heatmap service overlays heatmap visualizations on "live" webpages (e.g., through use of an application visualizer, which could be implemented as a browser plugin, using JavaScript type script code bundled with or referenced by a webpage, etc.). The dynamic heatmaps can be displayed in an GUI element-aware basis, and thus the "heat" visualization for a particular GUI element can be collected and tracked (again, regardless of where the element is positioned on various users' displays) and then displayed as an overlay "on top of" a corresponding GUI element, regardless of where the element is positioned on the analyst's page. Additionally, in various examples, the existence of GUI elements not displayed on an analyst's page (but that have associated heatmap data) can be surfaced to analysts, different interaction patterns detected for different user segments can be surfaced (and explored), and/or sequential same-page interactions can be presented, all with support for dynamic webpages having different rendered versions for different users.

FIG. 1 is a diagram illustrating an environment for implementing and utilizing overlay-based heatmaps for dynamic graphical user interfaces according to some examples. In FIG. 1, a heatmap service 118 is shown that can be implemented using software, computing hardware, or a combination of software and hardware, to implement the dynamic heatmap systems and techniques disclosed herein. The heatmap service 118 in some examples includes software executed by one or multiple computing devices, which can be potentially implemented in a distributed manner in multiple locations. In some examples, the heatmap service 118 is one service provided by a multi-tenant cloud provider network 100, though in other examples it is implemented separately, e.g., as a standalone service, as a software component inside a user's environment (e.g., data center, office, on a single server computing device), or the like.

A cloud provider network 100 (also referred to herein as a provider network, service provider network, etc.) provides users (e.g., user 102A, user 102B) with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure.

Users 102, via computing devices 104, can interact with a cloud provider network 100 across one or more intermediate networks 106 (e.g., the internet) via one or more interface(s), such as through use of application programming interface (API) calls, via a console implemented as a website or application, etc. As shown herein, the heatmap service 118 may provide multiple interfaces, e.g., event reporting interface(s) 120 and visualization interface(s) 134. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographic area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

To provide computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service 114 that a cloud provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. A "serverless" function can include code provided by a user or other entity-such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, an application can be "hosted" by a service 114, such as a managed compute service of a cloud provider network 100, or in another configuration such as by a web hosting service, a content distribution network, a "self-hosted" environment, or the like. Such applications can be implemented by an application backend 116, which can include one or more of a web server, an application server, application code, static and/or interpreted files, script code (e.g., JavaScript), media content, and the like. Many applications such as dynamic websites are thus made up of both a "front-end" of the application 108A that is rendered by a web browser or other application on a client computing device 104A together with the application backend 116.

In some examples, as part of implementing dynamic heatmap functionalities, an application 108A is configured by its developer (or maintainer, etc.) to include or reference an interaction reporting engine 110. In some examples, interaction reporting engine 110 is implemented via use of JavaScript code referenced by webpage content (e.g., is JavaScript code included in or referenced by an HTML type file), though other configurations exist that are known by those of skill in the art. As shown at circle (1), an "end user" type user 102A can utilize the application 108A, e.g., by the compute device 104A fetching code and/or content for a webpage from the application backend 116. This website code is used by the user's browser to render (or present) the webpage for the application, which can include executing the interaction reporting engine 110.

The interaction reporting engine 110 can then monitor the occurrence of certain interactions made by users with the particular page, such as by attaching an event listener to various UI elements of the page. For example, the interaction reporting engine 110 can detect "events" such as a click of a particular UI element, a "hover" of a mouse cursor over a particular UI element, a right-click (or "context menu" event), a mouseover, a mouse-out, a mouse-down, a mouse-up, a mouse move, a focus, a scroll, a "dwell" of a cursor over an element, etc.

Upon such an interaction occurring, a browser "event" thus occurs that can be detected by the interaction reporting engine 110. The interaction reporting engine 110 can then generate event data 150 for the event, which can be sent at circle (2) to an event reporting interface 120 of the heatmap service 118. This transmission may occur one-event-at-a-time or in a batch type manner, e.g., all event data over a period of time is sent periodically. The interaction reporting engine 110 can include in the event data 150 a variety of types of information, such as an identifier of the date and/or time of the event, what the event was (e.g., "click"), an identifier of the associated GUI element (e.g., a "tag" or "id" of the associated page element), text associated with the interacted—with element (e.g., button labels, link text, text surrounding the element, etc.), an identifier associated with the particular page (e.g., a unique identifier, a complete or partial URI or URL) or application, associated Cascading Style Sheet (CSS) values such as classes assigned to the element, parent container identifiers, Xpath values, etc. In some examples, the included metadata may include names or tags associated with GUI elements that may have been manually included in the underlying code by the application designer, though in some examples a component library is modified to generate such tags or identifiers automatically when it is used to add such elements to a page.

At circle (3), from the event reporting interface 120 the event data 150 may be directly stored in a data store 132 and then processed by an event processor 122, or directly passed on to the event processor 122 for processing. In various usage environments, it can be useful to perform one or more types of event data processing operations to allow for subsequent heatmap processing.

The event data processing operations performed by the event processor 122 can include a cardinality processor 124 for reducing "cardinality" in the event data as shown at circle (4). As one example, the event data 150 may correspond to a type of GUI element that common across multiple users but that is very user-specific as utilized. For example, a list of results populated from a search may include links to resources that are specific to the user—e.g., a list of files in a user's object store. In such a case, a link presented to a first user (for one of the user's files) that is first in a result set will appear different than a link presented to a second user (for that user's files) that is also first in a result set, despite the fact that both are—at a higher level—the initial links in a result set that point to some resource. Thus, the cardinality processor 124 can detect such types of events and cause them to be modified to be of a same type, e.g., indicative of being a first result in a result set. This can include adding additional metadata to the event data 150, modifying existing data in the event data 150, etc.

In some examples, the event data processing operations performed by the event processor 122 include use of a personally identifiable information (PII) processor to detect and remove PII from event data. Event data 150 captured in some environments could contain PII type information, such as usernames (e.g., links in an identity and access management application could be a name or username), storage location names (e.g., a storage "bucket" or folder name in an object storage service widget or console), phone numbers, company names, etc. Thus, the PII processor 126 at circle (5) can be used to identify and remove such information from event data. The PII processor 126 can utilize, for example, machine learning models trained to detect such types of PII, lists of PII values provided by the application developer, and/or other logic such as regular expressions, patterns, or other rules useful in identifying PII. With detected PII values, the PII processor 126 can thus remove (or replace) the PII from the event data.

The event data processing operations performed by the event processor 122 include, in some examples, a page identifier generator 128 that, at circle (6), can generate a page identifier (e.g., for a webpage or other GUI view of an application) that uniquely identifies the page that the event data belongs to. To be able to aggregate interaction data that belongs to a page, the heatmap service 118 needs to be able to uniquely identify a page, especially as a particular type of GUI element could be on different pages or the event data may not provide sufficient detail to identify a page. In some examples, a page identifier is generated by the page identifier generator 128 directly based on metadata in the event data 150, e.g., a request URI field captured by the interaction reporting engine 110 may provide a resource path and/or filename that can be useful in generating a unique, consistent page identifier. In other examples, URIs may not be standard and could include "noisy" user-specific data such as resource identifiers, account numbers, query parameters, or the like. In such cases, the page identifier generator 128 needs to remove such noise so that event data from different users—but on a same page-do accurately appear to be from a page with a same page identifier. In some examples, the page identifier generator 128 uses a machine learning based approach with inputs including the page's URI, title, are particular auto captured metadata from the page, to generate a unique page identifier (e.g., a predicted page name, an embedding for the page, etc.).

The event processor 122 may also include an aggregation engine 130 which, at circle (7), operates to compute aggregation type data pertaining to the event data. Such aggregations may be performed, for example, by performing a number of extract-transform-load (ETL) processing jobs. For example, the aggregation engine 130 may execute a job to identify a total number of clicks (or other types of interactions) for each of a multitude of GUI elements on a particular page. As another example, the aggregation engine 130 may execute a job to compute these values across different "slices" or dimensions of users, such as computing per-element clicks for various time periods (e.g., for every hour, every day, etc.) for particular groupings of users—e.g., "new" users (e.g., having an account age less than some threshold) or "old" users, for "external" versus "internal" (to the application owner's organization) users, etc. This aggregation data and/or processed event data can be stored (or updated) to the data store 132 at circle (8).

Thereafter, a visualization generation processor 136, as shown at circle (9), can access the stored data of the data store 132 and can generate heatmap data. In some examples, this occurs in an asynchronous manner (relative to particular user requests for heatmap data), and thus may be done on a scheduled or event-driven basis. In other examples, some or all of these processing operations described can be performed in a more synchronous type nature, e.g., responsive to particular requests for heatmap data.

In some examples, to visually distinguish different "weights" for interactions (e.g., to show the most or least interacted with elements), the visualization generation processor 136 can use color shading. The visualization generation processor 136 can thus compute and assign colors for elements of various pages based on the stored data. Colors can be assigned to GUI elements (e.g., identified using tags, identifiers, or the like) based on the weight of interactions particular to that page and the type of analysis performed.

For example, the visualization generation processor 136 may assign the color "red" to heavily interacted with elements, "yellow" to the next grouping of heavily interactive with elements, "green" to the next, "blue" to the next, and so on. This can be performed by the use of statistical measures, e.g., to identify a distribution of interaction counts and assigning colors based on an element's interaction count being some particular number of standard deviations from the mean. This can alternatively be performed by identifying various "cutoff" points among the interaction counts for elements of a page, and assigning colors accordingly—e.g., elements with interaction counts above a first cutoff threshold will be a first color, elements with interaction counts below the first cutoff threshold but above a second cutoff threshold will be a second color, and the like. Of course, many different color assignment schemes can be utilized to show relative and/or absolute interaction differences that can be straightforwardly implemented by those of skill in the art. The visualization generation processor 136 thus allows users to, for example, identify friction by analyzing sequences of interactions and visually highlighting through different coloring schemes.

Using a similar approach, the visualization generation processor 136 can identify diverging patterns involving the UI for different segments of users and represent them with different coloring schemes—e.g., interactions for "new" users are on a green-to-blue gradient while interactions for "experienced" users are on a "purple-to-pink" gradient. Additionally, in some examples the ordering of user interaction on a page can be determined by the visualization generation processor 136 and thereafter represented by rendering heatmap visualizations for the elements in a sequence.

In some examples, heatmaps will change dynamically on a page as time elapses. To represent visualizations accurately and mimic real user behavior, time elapse for rendering can be determined based on the time spent by the users on the page. Thus, in some examples, each new heatmap rendering can be plotted based on the time difference from the previous element. Using this technique, examples can demonstrate the behavior of users across different segments by computing time and maintaining the order of interactions separately for the user segments under consideration.

Thus, to provide heatmap visualizations (e.g., for application developer personas, such as user 102B), the user 102B can navigate to a particular page of interest as provided by the application backend 116, which is rendered as part of the application 108B at circle (A). In some examples, this user 102B has installed a browser plugin providing an interaction visualizer 112 component, though in other examples this interaction visualizer 112 component can optionally be provided as part of the application 108B itself (e.g., by the application backend 116 as embedded or referenced JavaScript).

When loading this page, the interaction visualizer 112 detects the load and sends a request, at circle (B), to a visualization interface 134 of the heatmap service 118 at circle (C). This request may identify a particular page that the heatmap data is sought for, and optionally provide other filters or values needed to identify the particular data the heatmap is sought for. For example, a time range of interest may be provided that limits the heatmap data to be relevant for that time range (e.g., last week, last month, last year, all time). As another example, an identifier of a particular user group of interest can be provided—e.g., an age of the user's account (e.g., only users having accounts that are a week old or less), an organization or domain name associated with the users' account (e.g., all data from user accounts at "example-.com" or "Company Y"), or the like.

In response, at circle (D), the visualization generation processor 136 can gather the relevant heatmap data for the request, which may have been pre-computed (at circle (9)) or completely or partially performed at this point, such as consolidating heatmap data pre-computed on a daily basis to generate heatmap data for a particular 2-day window. Thus, a response including heatmap data (e.g., identifiers of GUI elements for the page and associated colors) can be passed back in response, whereby at circle (E) the interaction visualizer 112 can overlay the requested heatmap on top of the "live" page, e.g., by drawing a partially opaque color shading, with a color identified in the response, on top of the corresponding GUI element.

For example, FIG. 2 is a diagram illustrating non-static heatmap element displays for dynamic webpages according to some examples. In this example, a simple GUI 202A and 202X are shown for two separate end users of an application 108A/108X. Each GUI 202 includes a common portion (e.g., a widget) showing a collection of "recently viewed" pages provided by (or linked to by) the application. Because the links in this GUI are customized based on the particular logged-in user account, each is different—e.g., the first GUI 202A includes a list of recently viewed resources including object storage, virtual machines, monitoring service, backup service, and networking setup; the second GUI 202X includes a list of recently viewed resources including machine learning service, account management, object storage, networking setup, and billing.

If traditional "static" heatmap approaches would be utilized, if these users clicked on "object storage" in their respective interfaces, the resultant heatmap would show an approximate half and half split between the first list result element and the third list result element. This can be further problematic because such approaches typically utilize a screenshot of the interface to plot upon-here, there is no common underlying interface (due to its "customized" or dynamic nature) and thus any screenshot that is generated is necessarily misleading—e.g., a screenshot of the second GUI 202X would show a similar amount of interaction with both the first element ("machine learning service") and the third element ("object storage"), which is incorrect.

Instead, examples disclosed herein can improve this issue by being able to take note of which particular UI elements were interacted with and generate heatmap visualizations based on this knowledge. For example, an application developer persona user 102B may load the same GUI 202B. Even though this user 102B has a different set of results, the interactions from users 102A and 102X can be represented with a "high indicator" 206 (e.g., a semi-opaque shading in a color, such as red) overlaid on top of the "object storage" element, wherever it is on the page! Note here this causes the high indicator 206 to be placed over a fifth element, which is correct (as showing interactions with the "object storage" link) despite the actual interactions occurring with regard to the first and third elements, respectively.

Additionally, other interactions can be shown with heatmap overlays that may not be on certain users' interfaces, such as the "medium" indicator 204 shown here (e.g., a semi-opaque shading in a color, such as yellow) that may be based on yet other, non-illustrated users interacting with a "database service" link in their own GUIs.

Moreover, in some examples, the developer persona may not even have a particular GUI element visible that does have heatmap data associated with it (for a page)—e.g., the second user 102X may have clicked on the fifth element for "billing," which may lead to heatmap data generated for this element. In some such examples, the heatmap data may be returned for this element (e.g., a pairing of a GUI element identifier and a color) and if it does not exist on the user's 102B GUI 202B, the interaction visualizer 112B may be configured to notify the user that other heatmap data exists for non-shown elements, such as via a "popup" or tooltip type notification, which may present that information to the user and/or allow the user to view that heatmap information.

Figure 3:
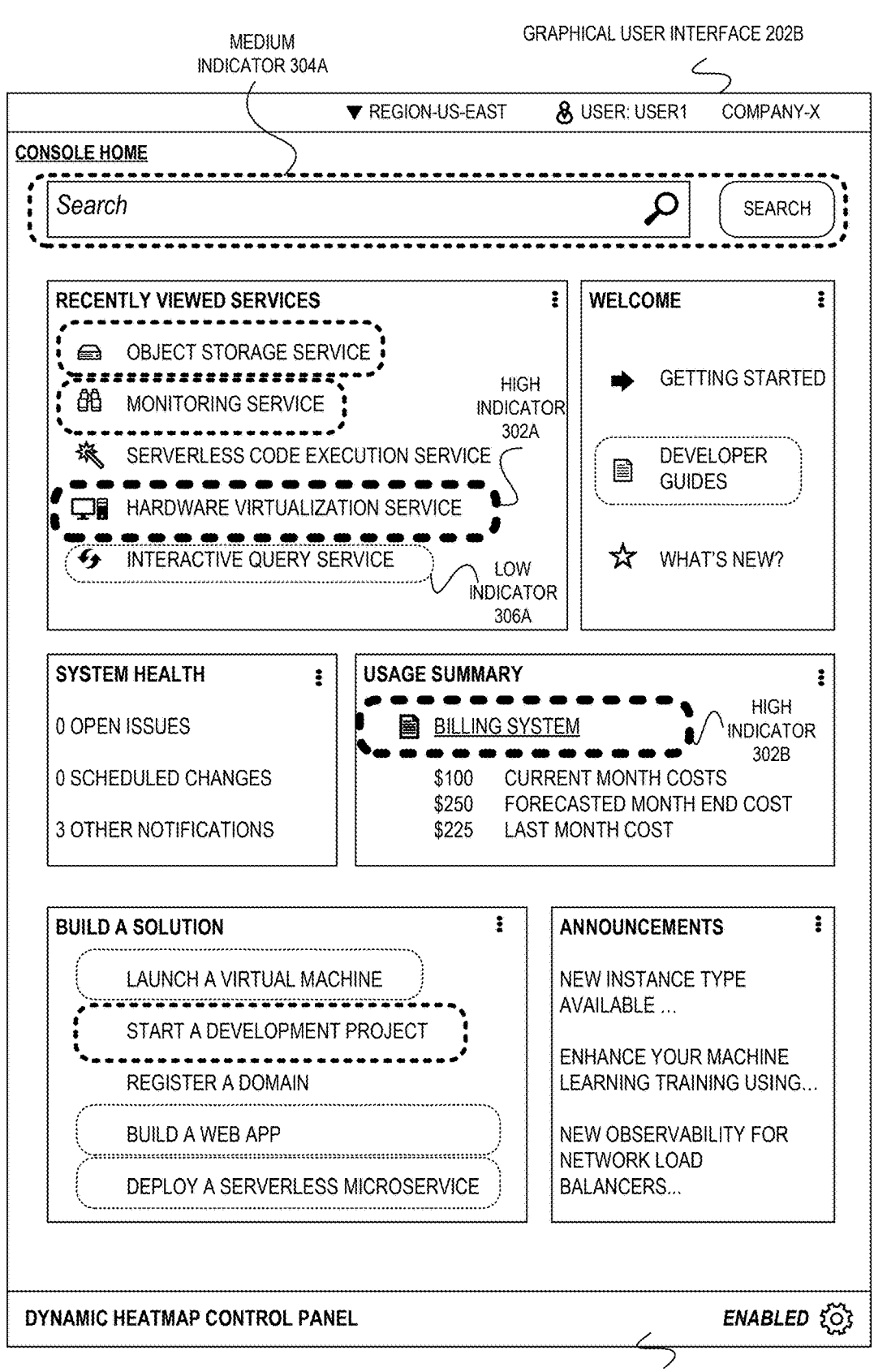
FIG. 3 is a diagram illustrating differentiated heatmap elements corresponding to interaction frequencies according to some examples.

FIG. 3 is a diagram illustrating differentiated heatmap elements corresponding to interaction frequencies according to some examples. In this example, a GUI 202B is shown for a console type application, such as one provided by a cloud provider network. This illustration also features a minimized dynamic heatmap control panel 306 (e.g., provided by the interaction visualizer 112), which can be expanded to provided the user additional control over whether heatmaps are to be shown, how they are shown, and what they are shown for.

In this example, a variety of different indicators are shown to illustrate different levels of interactivity among various users of the application. As shown, two high indicators 302A-302B (e.g., red color shading overlays) are shown to highlight that most interactions occur with a "hardware virtualization service" link and a "billing system" link. Also, four different medium indicators (e.g., medium indicator 304A, such as an orange color shading overlay) are shown to indicate that users are interacting to a somewhat lesser extent with a search bar, an object storage service link, a monitoring service link, and a "start a development project" link. Finally, five different low indicators (e.g., low indicator 306A, such as a yellow color shading overlay) are shown indicating a relatively low number of interactions with an interactive query service link, a developer guides link, a "launch a virtual machine" link, a "build a web app" link, and a "deploy a serverless microservice" link. Of course, many more or fewer different levels of interactivity can be shown with different types (e.g., colors) of indicators.

Figure 4:
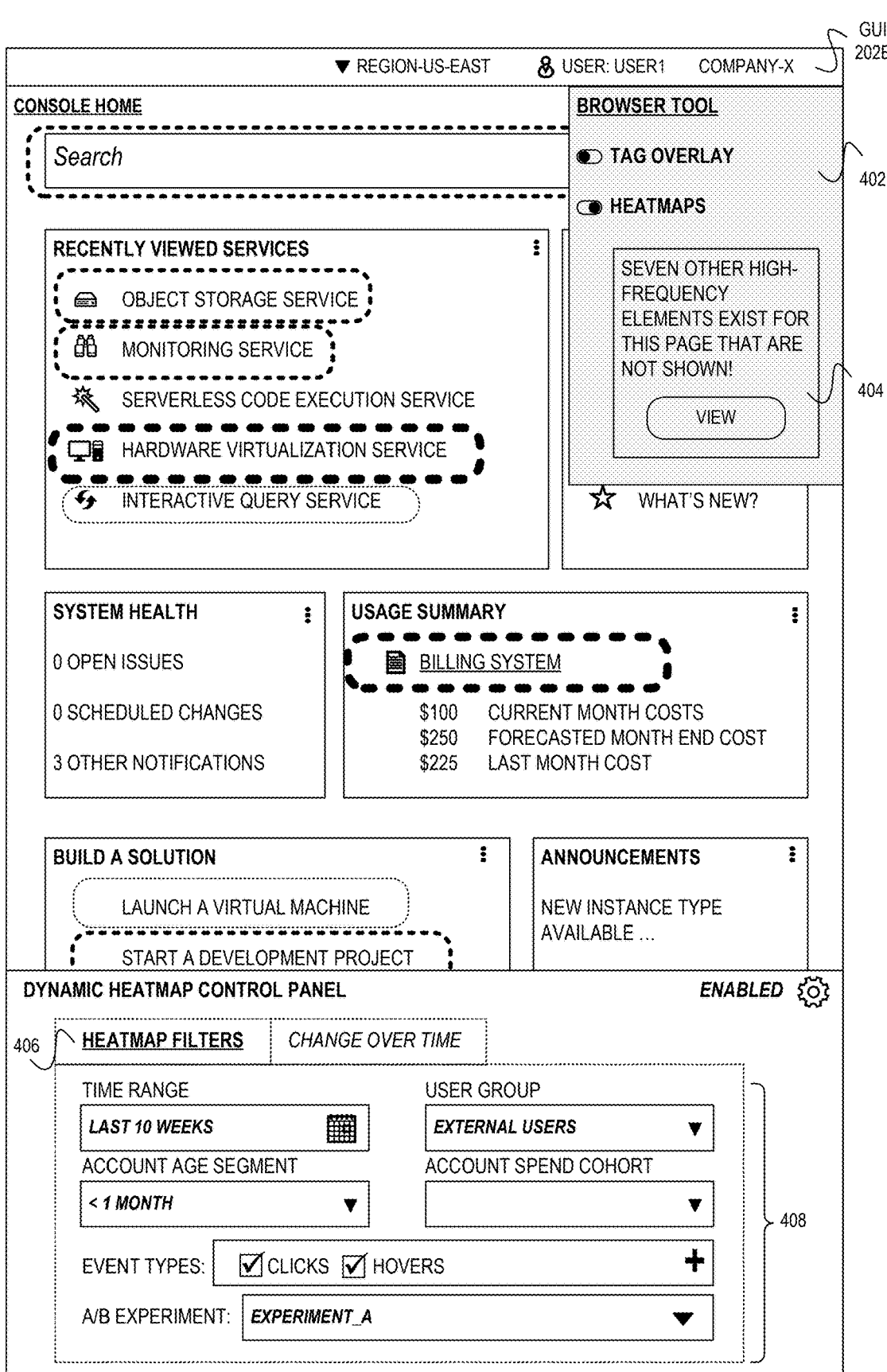
FIG. 4 is a diagram illustrating a browser tool indicating non-visualized heatmap data and a dynamic heatmap control panel with filters according to some examples.

In some cases, the heatmap information can be further customized by the end user. FIG. 4 is a diagram illustrating a browser tool 402 indicating non-visualized heatmap data and a dynamic heatmap control panel 406 with filters according to some examples. As indicated herein, a browser tool 402 (provided by the interaction visualizer 112) can be provided to enable or disable certain functionalities, such as creating a tag overlay (e.g., showing a border around GUI elements on the page) or showing heatmaps. In this example, the heatmap data returned from the heatmap service 118 may have included heatmap data for additional elements that are not currently being shown on this particular user's GUI 202B, and the browser tool 402 may include a panel 404 bringing this to the user's attention-here, seven other "high-frequency" elements exist that are not visible, and a button is included allowing the user to view information associated with these elements (and/or to actually load the elements on the page, together with overlaid heatmap data).

In this figure the control panel 306 is expanded, providing the user with the ability to customize aspects of the heatmap presentation. For example, the control panel 306 can include a heatmap filters section 406 allowing the user to configure filters 408 of interest—e.g., to select a time range of interest, a user group of interest, an account age of interest, an account spend cohort (e.g., accounts that spend less than a certain amount over a time period, or more than another amount, etc.), a particular "experiment" (e.g., a version of a page presented to users, such as via A/B testing) by selecting an experiment identifier, etc. The filters 408 also allow the user to specify particular interaction types they are interested in seeing, whether it be clicks, hovers, etc., or combinations thereof. Upon updating these values, the interaction visualizer 112 may send another request via a visualization interface 134 to obtain updated heatmap data, and upon its return it thereafter will update the heatmap overlay accordingly.

FIG. 5 is a diagram illustrating detected pattern difference surfacing via a browser tool 502 and overlaid heatmap data according to some examples. As described earlier herein, in some examples the visualization generation processor 136 can identify, from the stored event data, the existence of significant "pattern" (e.g., heatmap) difference between different portions or segments of users, time frames, or other dimensions. This information can be provided via a separate "get pattern differences" type API request (one of visualization interface(s) 134) issued by the interaction visualizer 112, and/or provided with the heatmap data provided with regard to circle (B) in FIG. 1, etc. Thereafter, this information can be provided (or "surfaced") to the developer type persona, such as through the browser tool 402. As shown, the browser tool 402 includes a heading 502 indicating that significant pattern differences have been found.

The browser tool 402 also identifies (at least some of) these pattern differences and allows the user to immediately view them via heatmap overlays. For example, a first pattern difference 504A pertaining to interaction differences occurring in the last month compared to the last year, across all users exists, as does a second detected pattern difference 504B comparing interactions between "new" and "old" accounts in the past ten weeks. A third pattern difference 504C, here selected by the user to be shown, indicates pattern differences detected over the last ten weeks between user accounts that spend less than $100 (in some unit time) compared to user accounts that spend more than $5000 (in the same unit time). Upon this third pattern difference 504C being selected (here, via a "radio button" UI element of the panel 402), a key is displayed indicating that heatmaps for one group are shown with a red-to-yellow gradient (where red overlay shading indicates high frequency interaction and yellow indicates low), while heatmaps for the other group are shown with a different color (blue-to-purple) gradient.

For the sake of simple illustration, these different segments are illustrated in FIG. 5 using the circle (A) to reflect heatmap elements corresponding to the first group while the circle (B) reflect heatmap elements corresponding to the second group. Thus, in this simple example, it is simple to observe that users in the "less than $100 spend" group heavily interact with a search bar (and less with a "hardware virtualization service" link and then even less with "start a development project" and "build a web app" links), while users in the "greater than $5000 spend" group heavily interact with the "monitoring service" link and the "launch a virtual machine" links, and comparatively less with the "deploy a serverless microservice" link.

Accordingly, users can explore various pattern differences via the browser tool 402 and view the associated heatmap visualization overlays in real time overlaid on top of the user's rendered GUI, providing visibility into the interactions involving those specific GUI elements the user sees. However, other types of interactive features can be enabled via the dynamic heatmaps techniques described herein.

For example, FIG. 6 is a diagram illustrating heatmap element usage for presenting interaction sequences according to some examples. As shown, the GUI 202B can be configured, for example via use of a browser tool 402 panel or control panel 306, to illustrate a sequence of interactions for a particular page. Data for such interaction sequences can be provided via a separate "get interaction sequence" type API request (one of visualization interface(s) 134) issued by the interaction visualizer 112, and/or provided with the heatmap data provided with regard to circle (B) in FIG. 1, etc. This interaction sequence data may then be used, by the interaction visualizer 112, to illustrate sequences of interactions with the particular page using heatmaps.

As shown, a user may be presented a heatmap indicating where initial interactions (e.g., clicks) occur for a particular webpage, here we assume the highest interaction count corresponds to a search bar near the top of the interface. In this example, upon hovering over this interface element (or clicking on it, right-clicking on it, etc.), the interaction visualizer 112 can present another overlay GUI element 602 providing sequence type information describing patterns for sequences of interactions on a page. In this example, the GUI element 602 indicates information such as an amount of users that first selected this element, and then the "next" clicked elements together with corresponding observed percentages-here, a large majority then clicked a "search button" element while a smaller portion then clicked on a "help" link, both of which are illustrated herein with a circle (2). Thereafter, the next-clicked elements were a first search result, a scrollbar, a second search result, and then the help link in order of interaction frequency. Notably, in some examples these sequences can be illustrated via use of heatmaps in addition to this overlay GUI element 602, which may potentially change over time to illustrate the sequence in a stepwise manner.

Figure 7:
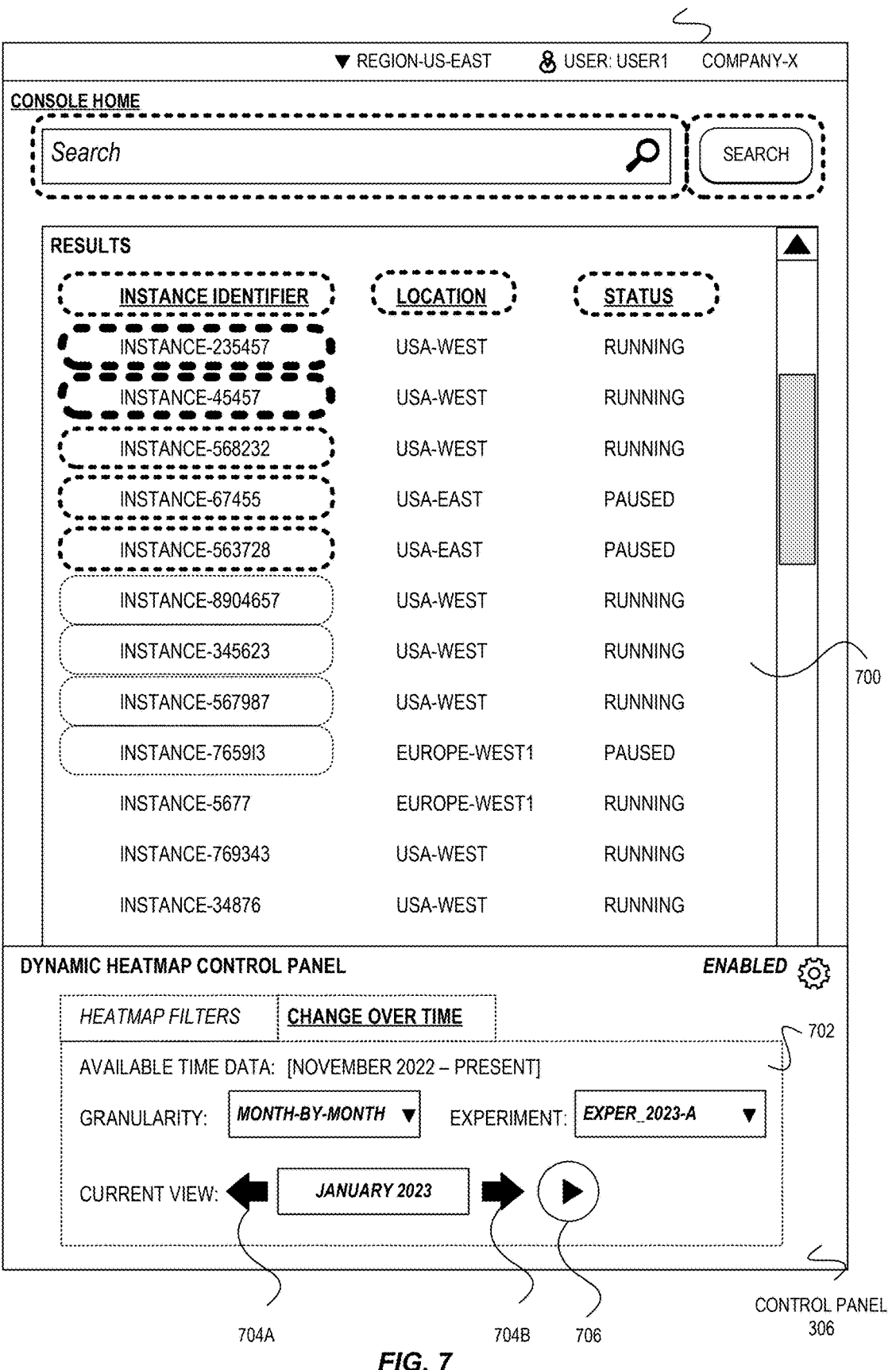
FIG. 7 is a diagram illustrating heatmap element usage for presenting interaction changes over time according to some examples.

As another example, FIG. 7 is a diagram illustrating heatmap element usage for presenting interaction changes over time according to some examples. It may be the case that some application developer type persona users may seek information indicating how usage of a particular webpage has changed over time, such as when a new page is first made available to users compared to when those users have used it for some time. Accordingly, in some examples the interaction visualizer 112 can present different heatmaps over time overlaid upon the same interface. For example, the control panel 306 may include a "change over time" type panel 702 allowing users to control how different heatmaps are displayed over time. Here, the panel 702 includes a granularity UI input element (here, a drop-down box) allowing the user to select a time granularity for which to show different heatmaps, as well as an experiment UI input element (also a drop-down box) allowing the user to select an experiment identifier for a particular experiment (e.g., a version of the GUI, such as when different versions are tested via an A/B experiment) that the user wishes to view heatmaps for. In this example, the user has indicated that they desire to see different heatmaps, for the same webpage, using an "EXPER_2023-A" experiment version, on a month-by-month basis. The panel 702 also includes a control interface including a month descriptor (here, "January 2023") indicating a currently displayed heatmap month, together with an input element 704A allowing the user to travel back one month (e.g., to view a heatmap corresponding to December 2022), an input element 704B allowing the user to travel forward one month (e.g., to view a heatmap corresponding to "February 2023"), and an input element 706 indicating that the heatmaps are to "auto-play" and thus be automatically updated periodically (e.g., every few seconds) to show heatmaps for successive periods.

FIG. 8 is a flow diagram illustrating operations 800 of a method for utilizing overlay-based heatmaps for dynamic graphical user interfaces according to some examples. Some or all of the operations 800 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by the heatmap service 118 of the other figures.

The operations 800 include, at block 802, obtaining event data associated with interaction events originated from users utilizing a graphical user interface (GUI) of an application, each event datum being associated with a graphical user interface (GUI) element of a webpage of the application, wherein the webpage is dynamic and includes different collections or arrangements of GUI elements for different ones of the users. In some examples the obtaining is performed by an interaction reporting engine 110 (e.g., by detecting interaction events and creating event data for these events), though in other examples the obtaining is performed by a heatmap service 118 (e.g., by receiving event data transmitted by various interaction reporting engines 110).

In some examples, obtaining the event data comprises: receiving interaction event data from interaction reporting engines executed by a plurality of computing devices of a plurality of users, wherein the interaction reporting engines observe and report the interaction events generated based on user interactions with the webpage; pre-processing the interaction event data to yield the event data; and storing the event data in a data store. In some examples, the pre-processing of the interaction event data comprises at least one of: reducing a cardinality of the interaction event data; removing personally identifiable information; or generating unique page identifiers for ones of the interaction event data.

The operations 800 further include, at block 804, generating, based on the event data, heatmap data for the webpage. The generating may be performed by a visualization generation processor 136, e.g., using data stored by a data store that may have been pre-processed by an event processor 122.

The operations 800 further include, at block 806, transmitting at least some of the heatmap data to a computing device, causing the computing device to display heatmap visualization elements overlaid on top of a rendered version of the webpage. The heatmap visualization elements may comprise semi-opaque shading graphics having a color corresponding to a relative amount of interactions with the underlying user interface element.

In some examples, the heatmap visualization elements utilize different colors, each indicative of a relative number of interactions with a corresponding GUI element.

In some examples, the operations 800 further include receiving a request for heatmap data, wherein the request identifies one or more filters; and selecting the at least some of the heatmap data, from the generated heatmap data, based on use of the one or more filters. In some examples, the one or more filters identify at least one of: a desired time window; an age of user account; a user group; an experiment identifier; or an account spend. A user group can be a selection of some particular grouping of users that have interacted with the webpage, such as "internal" users (e.g., belonging to an organization or domain associated with the webpage/application itself), "external" users (e.g., not belonging to an organization or domain associated with the webpage/application itself), users having a particular metadata element in common (e.g., having a same "role" in a user database or profile, having a common domain name in their email address), etc. An experiment identifier may be an identifier associated with a different version (or layout) of a webpage, such as when a developer is performing A/B testing (or similar) by serving different versions of the webpage to different users for the purposes of testing different layouts.

In some examples, the at least some of the heatmap data transmitted to the computing device includes heatmap data corresponding to a plurality of GUI elements; and the rendered version of the webpage including the overlaid heatmap visualization elements includes fewer than all of the plurality of GUI elements. In some examples, the operations 800 further include transmitting data to the computing device to cause display of a notification indicating that heatmap data is available for additional GUI elements not present on the rendered version of the webpage.

In some examples, at least one of the heatmap visualization elements is displayed over a GUI element that is located in a different location, on the rendered webpage, than locations of rendered webpages that are associated with ones of the interaction events.

In some examples, the operations 800 further include transmitting data to the computing device to cause display of a GUI element that indicates an existence of detected interaction pattern differences between different segments of users involving the webpage; and causing two or more heatmaps, corresponding to the pattern differences, to be overlaid over the webpage.

In some examples, the heatmap visualization elements are part of an interaction sequence identifying one or more sequences of user interactions with GUI elements of the webpage.

Figure 9:
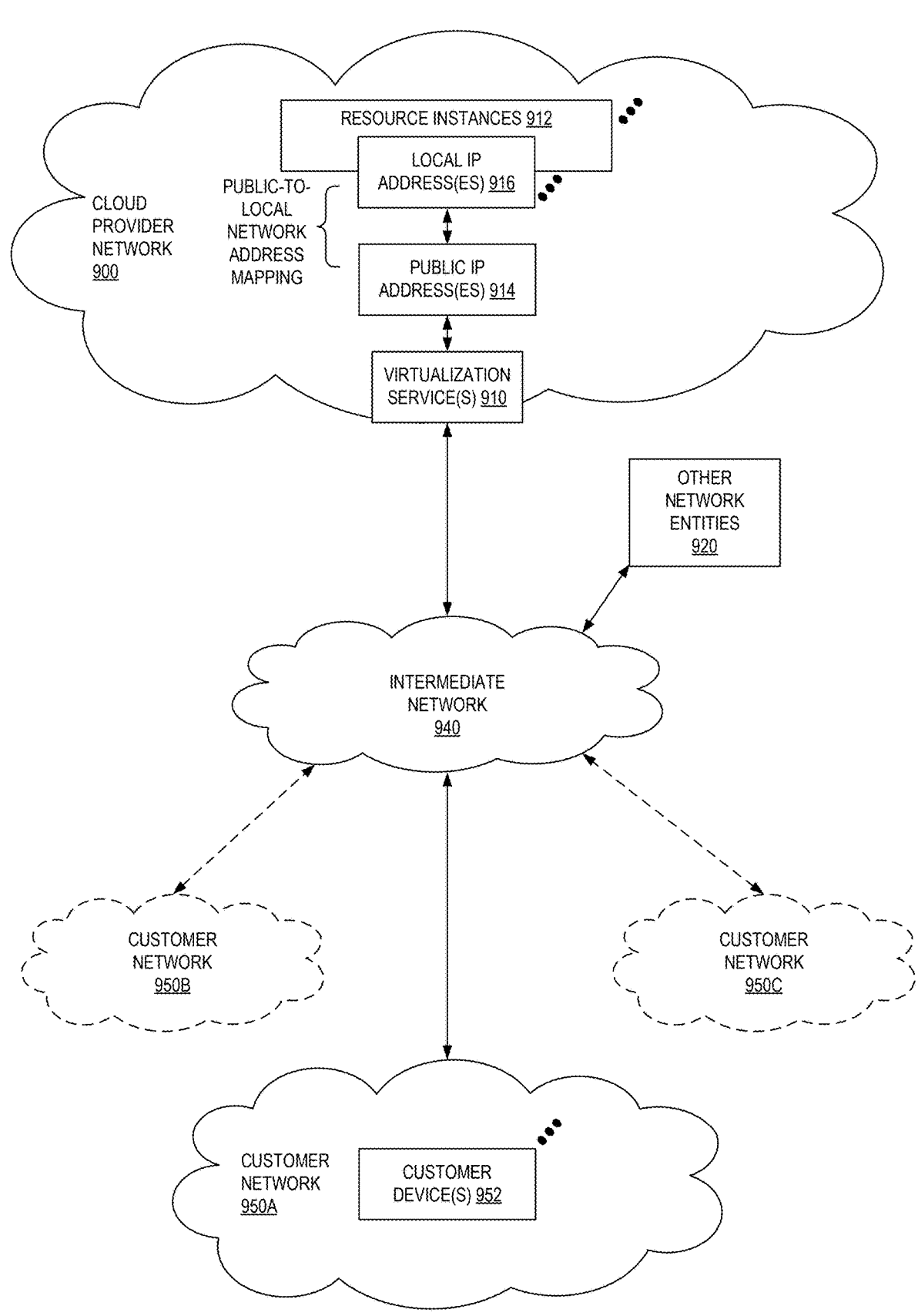
FIG. 9 illustrates an example cloud provider network environment according to some examples.

FIG. 9 illustrates an example provider network (or "service provider system") environment according to some examples. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some examples, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
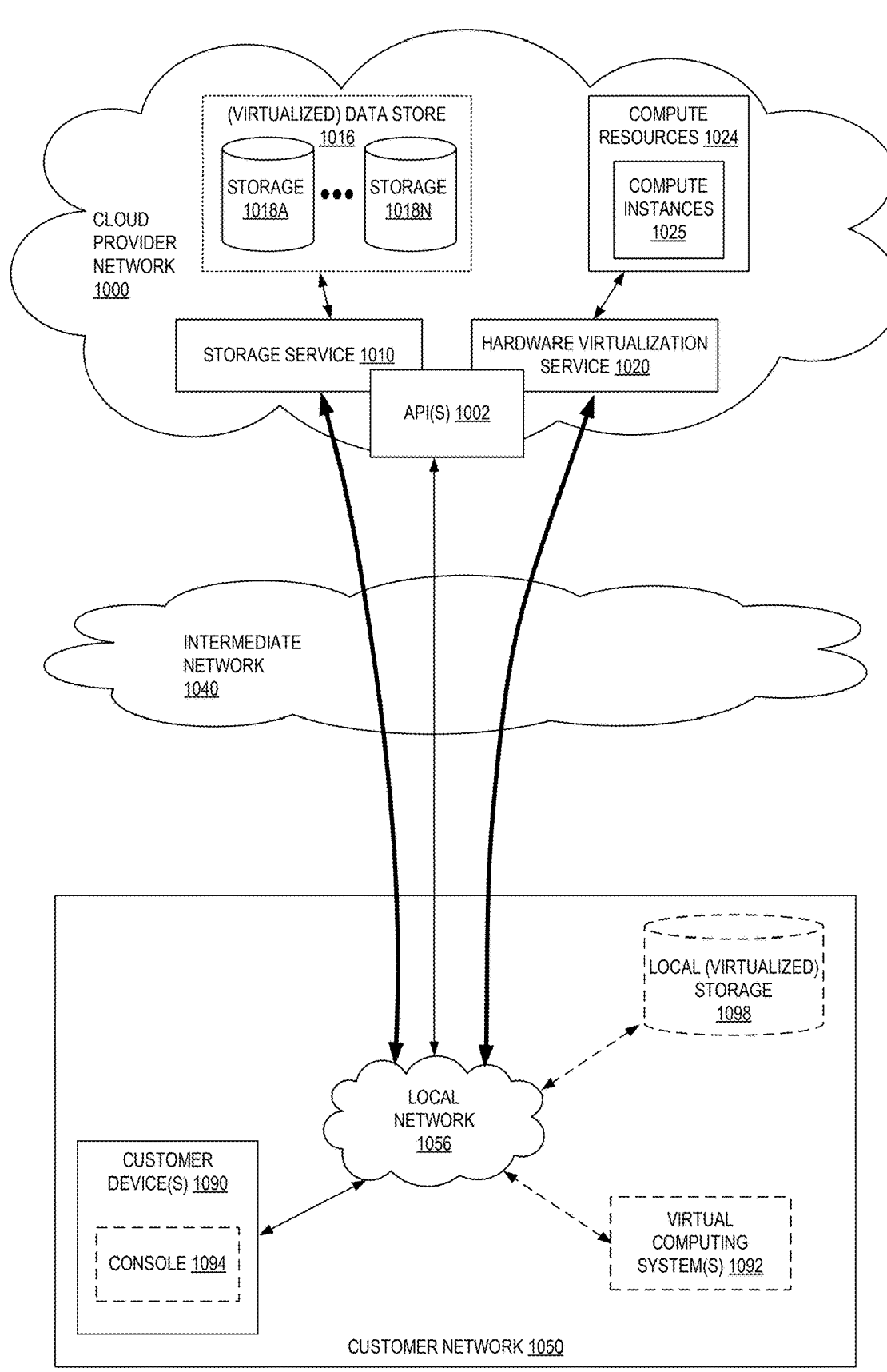
FIG. 10 is a block diagram of an example cloud provider network that provides a storage service and a hardware virtualization service to customers according to some examples.

FIG. 10 is a block diagram of an example provider network environment that provides a storage service and a hardware virtualization service to customers, according to some examples. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some examples, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some examples, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual data store 1016 (e.g., a folder or "bucket," a virtualized volume, a database, etc.) provided by the provider network 1000. In some examples, a virtualized data store gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized data store 1016) is maintained. In some examples, a user, via the virtual computing system 1092 and/or another customer device 1090, can mount and access virtual data store 1016 volumes via the storage service 1010 acting as a storage virtualization service, and these volumes can appear to the user as local (virtualized) storage 1098.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.

Illustrative Systems

Figure 11:
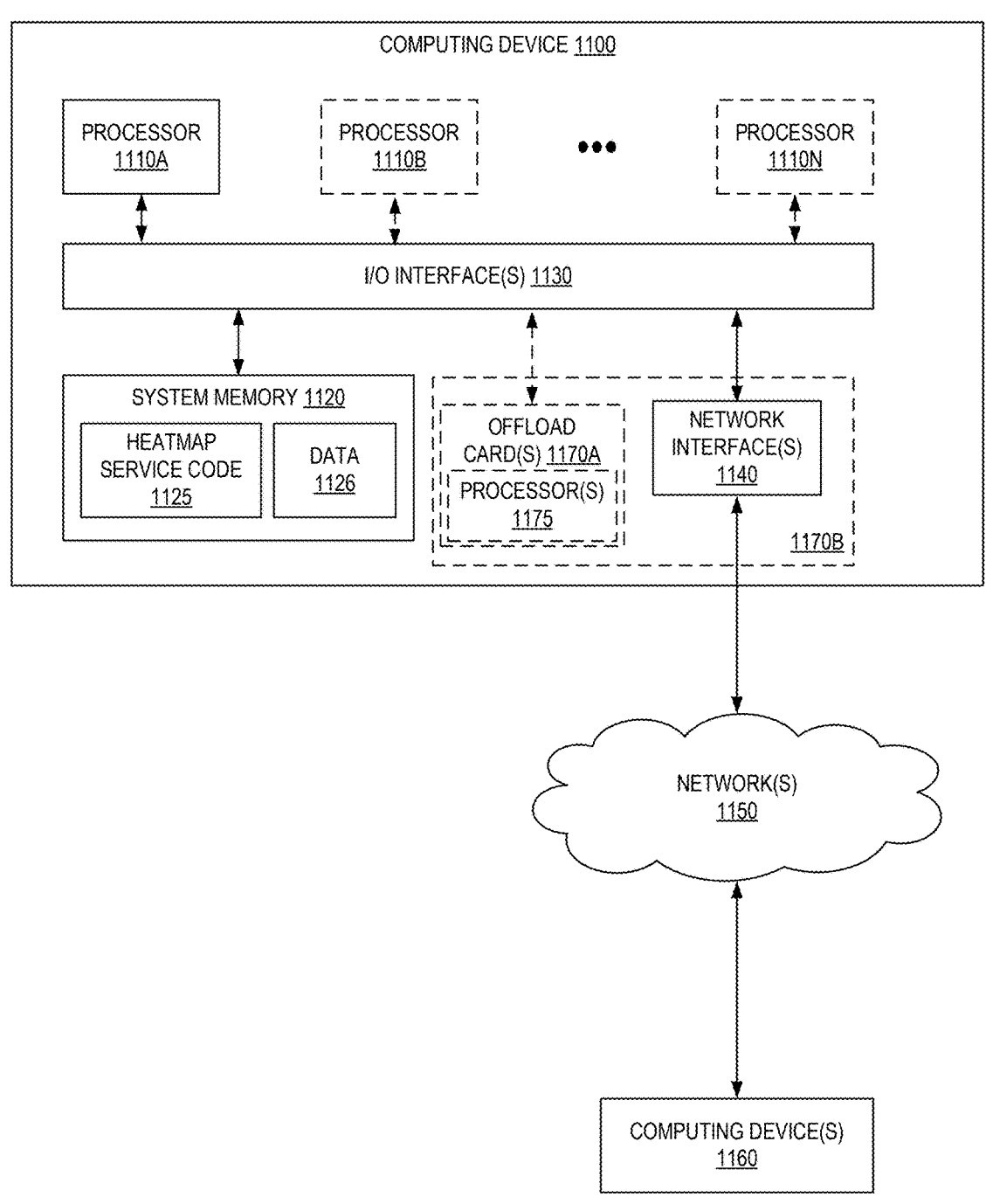
FIG. 11 is a block diagram illustrating an example computing device that can be used in some examples.

In some examples, a system that implements a portion or all of the techniques described herein can include a general-purpose computer system, such as the computing device 1100 (also referred to as a computing system or electronic device) illustrated in FIG. 11, that includes, or is configured to access, one or more computer-accessible media. In the illustrated example, the computing device 1100 includes one or more processors 1110 coupled to a system memory 1120 via an input/output (I/O) interface 1130. The computing device 1100 further includes a network interface 1140 coupled to the I/O interface 1130. While FIG. 11 shows the computing device 1100 as a single computing device, in various examples the computing device 1100 can include one computing device or any number of computing devices configured to work together as a single computing device 1100.

In various examples, the computing device 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various examples, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various examples, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1120 as heatmap service code 1125 (e.g., executable to implement, in whole or in part, the heatmap service 118) and data 1126.

In some examples, the I/O interface 1130 can be configured to coordinate I/O traffic between the processor 1110, the system memory 1120, and any peripheral devices in the device, including the network interface 1140 and/or other peripheral interfaces (not shown). In some examples, the I/O interface 1130 can perform any necessary protocol, timing, or other data transformations to convert data signals from one component (e.g., the system memory 1120) into a format suitable for use by another component (e.g., the processor 1110). In some examples, the I/O interface 1130 can include support for devices attached through various types of peripheral buses, such as a variant of the Peripheral Component Interconnect (PCI) bus standard or the Universal Serial Bus (USB) standard, for example. In some examples, the function of the I/O interface 1130 can be split into two or more separate components, such as a north bridge and a south bridge, for example. Also, in some examples, some or all of the functionality of the I/O interface 1130, such as an interface to the system memory 1120, can be incorporated directly into the processor 1110.

The network interface 1140 can be configured to allow data to be exchanged between the computing device 1100 and other computing devices 1160 attached to a network or networks 1150, such as other computer systems or devices as illustrated in FIG. 1, for example. In various examples, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some examples the offload card(s) 1170A or 1170B can perform compute instance management operations, such as pausing and/or un-pausing compute instances, launching and/or terminating compute instances, performing memory transfer/copying operations, etc. These management operations can, in some examples, be performed by the offload card(s) 1170A or 1170B in coordination with a hypervisor (e.g., upon a request from a hypervisor) that is executed by the other processors 1110A-1110N of the computing device 1100. However, in some examples the virtualization manager implemented by the offload card(s) 1170A or 1170B can accommodate requests from other entities (e.g., from compute instances themselves), and can not coordinate with (or service) any separate hypervisor.

In some examples, the system memory 1120 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1100 via the I/O interface 1130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1018A-1018N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
obtaining, at an event reporting interface of a heatmap service implemented in a cloud provider network, event data associated with interaction events originated from users utilizing a graphical user interface (GUI) of an application, each event datum being associated with a GUI element of a webpage of the application, wherein the webpage is dynamic and includes different collections or arrangements of GUI elements for different ones of the users;
generating, based on the event data, heatmap data for the webpage, the generating including:
pre-processing the event data, the pre-processing including reducing a cardinality of the event data by modifying a subset of the event data for different ones of users to be of a same type, the subset of the event data being associated with a common GUI element presented differently to the different ones of the users, the pre-processing further including at least one of: removing personally identifiable information (PII) from the event data, or generating a page identifier for each event datum; and
analyzing the pre-processed event data to create the heatmap data, the heatmap data identifying, for each of one or more GUI elements of the webpage, a color to be used for a corresponding heatmap visualization element to highlight the GUI element; and
transmitting at least some of the heatmap data to a computing device, causing the computing device to display heatmap visualization elements overlaid on top of a rendered version of the webpage, wherein the heatmap data includes element-color pairs indicating GUI elements and colors for the corresponding heatmap visualization elements.

2. The computer-implemented method of claim 1, further comprising:
receiving a request for heatmap data, wherein the request identifies one or more filters,
wherein the one or more filters identify at least one of:
a desired time window;
an age of user account;
an experiment identifier;
a user group; or
an account spend; and
selecting the at least some of the heatmap data, from the generated heatmap data, based on use of the one or more filters.

3. The computer-implemented method of claim 1, wherein at least one of the heatmap visualization elements is displayed over a GUI element that is located in a different location, on the rendered webpage, than locations of rendered webpages that are associated with ones of the interaction events.

4. A computer-implemented method comprising:
obtaining event data associated with interaction events originated from users utilizing a graphical user interface (GUI) of an application, each event datum being associated with a GUI element of a webpage of the application, wherein the webpage is dynamic and includes different collections or arrangements of GUI elements for different ones of the users;
pre-processing the event data, the pre-processing comprising reducing a cardinality of the event data by modifying a subset of the event data for different ones of users to be of a same type, the subset of the event data being associated with a common GUI element presented differently to the different ones of the users;
generating, based on the pre-processed event data, heatmap data for the webpage; and
transmitting at least some of the heatmap data to a computing device, causing the computing device to display heatmap visualization elements overlaid on top of a rendered version of the webpage.

5. The computer-implemented method of claim 4, wherein the heatmap visualization elements utilize different colors, each indicative of a relative number of interactions with a corresponding GUI element.

6. The computer-implemented method of claim 4, further comprising:
receiving a request for heatmap data, wherein the request identifies one or more filters; and selecting the at least some of the heatmap data, from the generated heatmap data, based on use of the one or more filters.

7. The computer-implemented method of claim 6, wherein the one or more filters identify at least one of:

a desired time window;

an age of user account;

a user group;

an experiment identifier; or an account spend.

8. The computer-implemented method of claim 4, wherein obtaining the event data comprises:

receiving the event data from interaction reporting engines executed by a plurality of computing devices of a plurality of users, wherein the interaction reporting engines observe and report the interaction events generated based on user interactions with the webpage; and storing the pre-processed event data in a data store.

9. The computer-implemented method of claim 4, wherein the pre-processing of the event data further comprises at least one of:

removing personally identifiable information; or generating unique page identifiers for ones of the event data.

10. The computer-implemented method of claim 4, wherein:

the at least some of the heatmap data transmitted to the computing device includes heatmap data corresponding to a plurality of GUI elements; and the rendered version of the webpage including the overlaid heatmap visualization elements includes fewer than all of the plurality of GUI elements.

11. The computer-implemented method of claim 10, further comprising transmitting data to the computing device to cause display of a notification indicating that heatmap data is available for additional GUI elements not present on the rendered version of the webpage.

12. The computer-implemented method of claim 4, wherein at least one of the heatmap visualization elements is displayed over a GUI element that is located in a different location, on the rendered webpage, than locations of rendered webpages that are associated with ones of the interaction events.

13. The computer-implemented method of claim 4, further comprising:

transmitting data to the computing device to cause display of a GUI element that indicates an existence of detected interaction pattern differences between different segments of users involving the webpage; and causing two or more heatmaps, corresponding to the pattern differences, to be overlaid over the webpage.

14. The computer-implemented method of claim 4, wherein the heatmap visualization elements are part of an interaction sequence identifying one or more sequences of user interactions with GUI elements of the webpage.

15. A system comprising:

a first one or more computing devices to implement a data store in a multi-tenant provider network; and a second one or more computing devices to implement components of a heatmap service in the multi-tenant provider network, the components including instructions that upon execution cause the components to:

obtain event data associated with interaction events originated from users utilizing a graphical user interface (GUI) of an application, each event datum being associated with a GUI element of a webpage of the application, wherein the webpage is dynamic and includes different collections or arrangements of GUI elements for different ones of the users;

pre-process the event data, the pre-processing comprising reducing a cardinality of the event data by modifying a subset of the event data for different ones of users to be of a same type, the subset of the event data being associated with a common GUI element presented differently to the different ones of the users;

generate, based on the pre-processed event data, heatmap data for the webpage;

store the heatmap data in the data store; and transmit at least some of the heatmap data to a computing device, causing the computing device to display heatmap visualization elements overlaid on top of a rendered version of the webpage.

16. The system of claim 15, wherein the heatmap visualization elements utilize different colors, each indicative of a relative number of interactions with a corresponding GUI element.

17. The system of claim 15, wherein the components further include instructions that upon execution cause the components to:

receive a request for heatmap data, wherein the request identifies one or more filters; and select the at least some of the heatmap data, from the generated heatmap data, based on use of the one or more filters.

18. The system of claim 17, wherein the one or more filters identify at least one of:

a desired time window;

an age of user account;

an experiment identifier;

a user group; or an account spend.

19. The system of claim 15, wherein to obtain the event data the components are to:

receive the event data from interaction reporting engines executed by a plurality of computing devices of a plurality of users, wherein the interaction reporting engines observe and report the interaction events generated based on user interactions with the webpage; and store the pre-processed event data in the data store.

20. The system of claim 15, wherein to pre-process the event data, the components are further to:

remove personally identifiable information; or generate unique page identifiers for ones of the event data.

* * * * *